United States Patent [19]

Fathi

[11] Patent Number: 4,712,051

[45] Date of Patent: Dec. 8, 1987

[54] ADAPTER FOR SWITCHING FROM PRIMARY TO STANDBY DEVICE UPON FAILURE OF PRIMARY DEVICE

[75] Inventor: Saul S. Fathi, Huntington, N.Y.

[73] Assignee: Ultima Electronics Ltd., Farmingdale, N.Y.

[21] Appl. No.: 869,564

[22] Filed: Jun. 2, 1986

[51] Int. Cl.[4] ........................ H05B 39/10; G05B 9/02

[52] U.S. Cl. .................................... 318/564; 318/565; 315/93; 315/88; 340/656

[58] Field of Search ....................... 318/563, 564, 565; 307/38, 39; 315/88, 93, 136; 219/486; 340/635, 653, 654, 656

[56] References Cited

U.S. PATENT DOCUMENTS

| | | | |
|---|---|---|---|
| 3,562,580 | 2/1971 | Blomgren | 315/88 |
| 3,790,846 | 2/1974 | Morris | 315/88 |
| 3,809,917 | 5/1974 | Vore | 307/39 |
| 3,883,777 | 5/1975 | Morita | 315/88 |
| 4,034,259 | 7/1977 | Schock | 315/88 |
| 4,061,911 | 12/1977 | Krasin | 315/88 |
| 4,127,854 | 11/1978 | Gardner | 307/39 |
| 4,461,974 | 7/1984 | Chin | 315/88 |
| 4,486,689 | 12/1984 | Davis | 315/88 |
| 4,575,640 | 3/1986 | Martin | 307/39 |

*Primary Examiner*—Bernard Roskoski
*Assistant Examiner*—Patrick C. Keane
*Attorney, Agent, or Firm*—Edward H. Loveman

[57] ABSTRACT

This adapter has a housing containing an automatic electrical switching circuit, a plug for connecting the circuit to an external A.C. power source, and sockets for mounting primary and standby lamps on the housing in circuit with the switching circuit. The circuit includes a conventional rectifier bridge and a transistor which is normally biased off so that the standby lamp is off, when the primary lamp lights. When the primary lamp goes off (burns out), the transistor conducts and the standby lamp is automatically turned on. When the primary lamp again operates the transistor is again biased off and the standby lamp is automatically turned off. A signal lamp in the switch circuit lights when the standby lamp is on. Motors or other power consuming devices may be substituted for the lamps.

5 Claims, 4 Drawing Figures

ADAPTER FOR SWITCHING FROM PRIMARY TO STANDBY DEVICE UPON FAILURE OF PRIMARY DEVICE

BACKGROUND OF THE INVENTION

1. Field of the Invention

This invention relates to the art of electronic switching systems for power supplies of lamps, motors and other power consuming devices, and more particularly concerns an adapter connectable to an external power supply and including an automatic switching circuit interposed between the power supply and power consuming devices, such as lamps mountable on the adapter, to keep at least one of a pair of primary and standby power consuming devices operating at all times.

2. Description of the Prior Art

Industrial plants, hospitals, public buildings, theaters, bridges, highways, tunnels, airports, etc. . . often have certain electrical lighting fixtures on which is mounted a lamp which must be operating at all times. If the lamp fails to operate, a serious safety hazard is created. This situation has been recognized heretofore. One conventional expedient to remedy the situation is to provide a critical lighting fixture with two or more lamps, so that at least one lamp is operating even though others fail. This expedient has several disadvantages and objections. The most obvious being the high maintenance cost in both lamp bulbs and manpower to replace same. In addition, very often these lamp fixtures are unattended, so that all lamps can burn out to create a hazardous condition. Another objection is that in an installation where only one lamp is required, an excessive amount of power is consumed by burning two or more lamps at the same time. Many of these critical lighting fixtures are located on high ceilings or in other places difficult to reach, so that an appreciable interval of time may elapse before all inoperative lamps may be replaced. This situation undesirably prolongs the hazardous condition in an installation where no lamps are operating and at least one lamp must be operating at all times.

SUMMARY OF THE INVENTION

3. Objects of the Invention

It is a principal object of the present invention to overcome the abovementioned and other difficulties, disadvantages and objections of prior expedients for keeping a lamp fixture in operation at all times.

Another object of the present invention is to provide an appliance adapter including a fail-safe, electronic, automatically operating, switching system, so arranged that at least one of a plurality of power consuming devices such as lamps will be in operation at all times.

A further object of the present invention is to provide an adapter as described, wherein one of the power consuming devices is a primary lamp and another is a standby lamp, with the switching system being so arranged that in the event of failure of the primary lamp, the standby lamp which is normally off, will be automaticaly switched on; and wherein the standby lamp will be automatically turned off and restored to standby condition, when the primary lamp is restored to operating condition.

Still another object of the present invention is to provide an adapter as described wherein the fail-safe switching circuit includes an alarm such as a signal lamp to indicate that the primary lamp has failed and that the standby lamp is operating.

A still further object of the present invention is to provide an adapter as described wherein the adapter has means for connecting it to a socket in a conventional A.C. power outlet or lighting fixture.

Still another further object of the present invention is to provide an adapter as described where the power consuming devices such as lamps, motors, etc... can be mounted directly on or connected to the adapter in circuit with the automatic fail safe switching circuit.

These and other objects and many of the attendant advantages of this invention will be readily appreciated as the same becomes better understood by referene to the following detailed description when considered in connection with the accompanying drawings in which:

DESCRIPTION OF THE PREFERRED EMBODIMENTS

Figure 2:
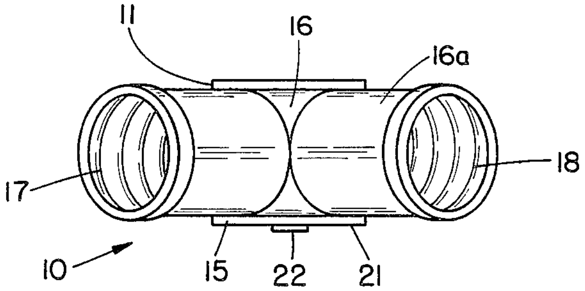
FIG. 2 is a bottom plan view of the adapter of FIG. 1, with the lamps removed.
Figure 1:
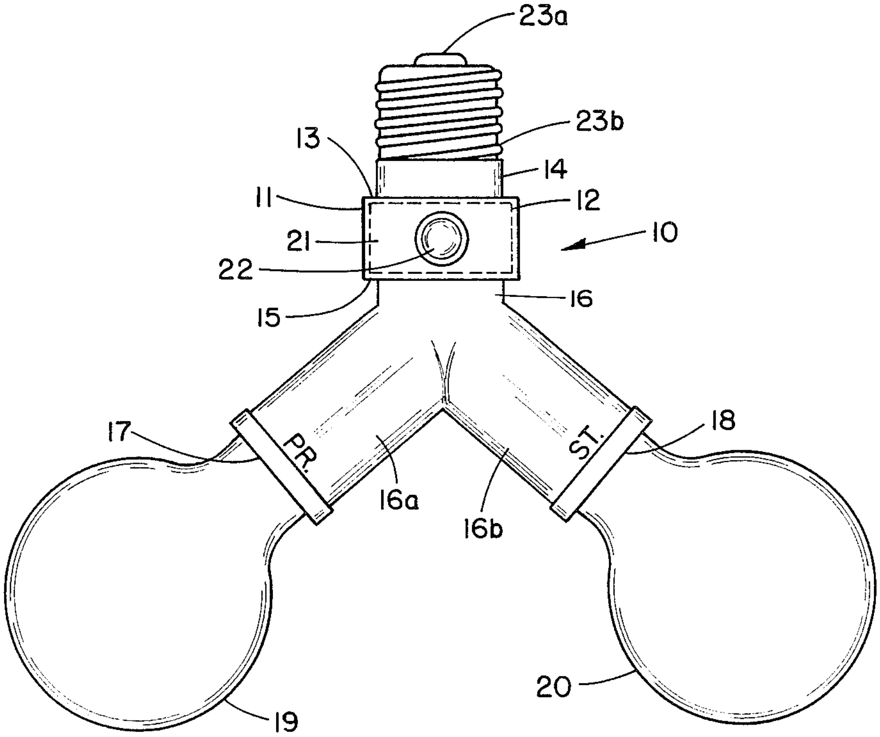
FIG. 1 is a side elevational view of an appliance adapter embodying the invention, carrying primary and standby lamps.
Figure 3:
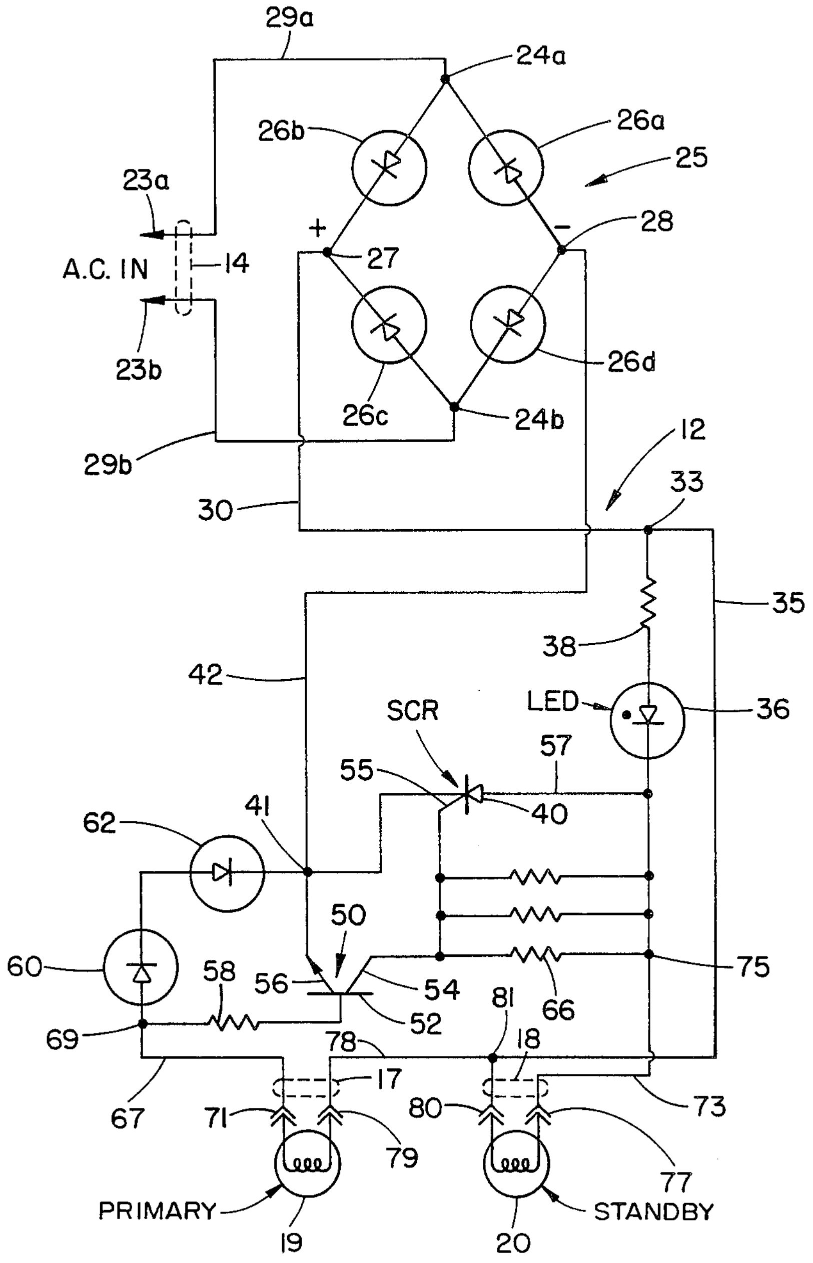
FIG. 3 is a diagram of the automatic, fail-safe power supply switching circuit employed in the adapter.

Referring now to the drawings wherein like reference characters designate like or corresponding parts throughout, there is illustrated in FIGS. 1 and 2 an appliance adapter generally designated by reference numeral 10. The adapter 10 has a housing 11 containing a fail-safe power supply switching circuit 12. On one side 13 of the housing 11 is a threaded plug 14 adapted for screwing into a conventional socket of an outlet of an alternating current (A.C.) power supply, or into a socket of a conventional lighting fixture directly connected to such a power supply. Mounted to a side 15 of the housing 11 is an electrical conduit 16 having two branches 16*a* and 16*b* containing respective sockets 17 and 18 in which primary (PR.) lamp 19 and standby (ST.) lamp 20 are removably mounted. On another side 21 of the housing 11 is an alarm signal lamp 22 which is normally off. The signal lamp 22 goes on automatically when the primary lamp 19 is removed or fails and the standby lamp 20 operates. The signal lamp 22 goes off automatically when the primary lamp 19 is replaced and operates, and the standby lamp 20 automatically goes off. The sockets 17, 18 and the signal lamp 22 are connected into the switching circuit 12 shown in detail in FIG. 3 to which reference is now made.

In the switching circuit 12, the plug 14 has two terminal 23*a* and 23*b* to which A.C. voltage is applied from a conventional power supply. The terminals 23*a* and 23*b* are respectively connected via respective wires 29*a*, 29*b* to a pair of junctions 24*a* and 24*b* of a conventional full wave power rectifier 25 having a positive junction 27 and a negative junction 28. The rectifier 25 has four conventional power diodes 26*a*, 26*b*, 26*c*, and 26*d*. The diode 26*a* is connected between the junctions 24*a* and 28. The diode 26*b* is connected between the junctions 24*a* and 27. The diode 26*c* is connected between the junctions **24*b* and 27. The diode 26*d* is connected between the junctions 28 and 24*b*. A wire 30 extends from the positive junction 27 of the rectifier 25 to a junction 33 which is connected via a wire 35 to a junction 81**.

A light emitting diode (LED) 36 is connected to the junction 33 via a resistor 38. The diode 36 is connected to a silicon controlled rectifier (SCR) 40 via a wire 57. The SCR 40 is connected to a junction 41. A wire 42 connects the junction 41 to the negative terminal or junction 28 of the rectifier 25.

A transistor 50 has a base 52, a collector 54 and an emitter 56. The base 52 is connected via a resistor 58 and a junction 69 to a series connected pair of diodes 60, 62, to the junction 41 to which the emitter 56 is also connected. The collector 54 is connected to the trigger 55 of the SCR 40. A plurality of resistors 66 are connected in parallel between the collector 54 and the SCR trigger 55. A wire 67 is connected between the junction 69 and one terminal 71 of the socket 17 for the primary lamp 19. A wire 73 is connected between a junction 75 and a terminal 77 of the socket 18 which receives the standby lamp 20. A wire 78 from the junction 81 connects the second terminal of the socket 17 to the positive terminal of the rectifier bridge 25. Similarly, a wire 82 connects the junction 81 to the second terminal of the socket 18 to the positive terminal of the rectifier bridge 25. The sockets 17 and 18 respectively receive the primary lamp 19 and the standby lamp 20 as hereinabovementioned.

In operation when the adapter 10 is attached to a conventional A.C. power supply, power will be applied via the terminals **23*a* and 23*b* of the plug 14 to the rectifier 25. During one half the power cycle current flows through the wire 29*a*, the diode 26*b*, the wire 30, the wire 35, the wire 78, to the lamp 19; the wire 67 to the rectifiers 60, 62, the wire 42, the diode 26*d*, and the wire 29*b* to the plug 14. During the other half of the power cycle, current flows from the plug 14 through the wires 29*b*, the diode 26*c*, the wires 30, 35 and 78, to the lamp 19, the wire 67, to the rectifiers 60, 62, the wire 42, the diode 26*a* and the wire 29*a* to the plug 14. The transistor 50, the alarm lamp 36, the SCR 40 and the standby lamp 20** are all OFF.

Suppose now that the primary or main lamp 19 is extinguished for any reason or is removed from the socket 17. The normally OFF transistor 50 will become biased ON, and the SCR 40 will be triggered ON. This will cause the LED 36 to light. At the same time current will flow via the wire **29*a*, the diode 26*b*, the wires 30 and 35 to the lamp 20, the wire 73, resistors 66, transistor 50, to the wire 42, diode 26*d*, and the wire 29*b* to the plug 14 to light the standby lamp 20 during one half of each power cycle. During the other half cycle, current will flow through the wire 29*b*, the diode 26*c*, the wires 30 and 35 to the lamp 20, the wire 73, the resistors 66, the the transistor 50, the wire 42, the diode 26*a*, the wire 29*a* to the plug 14 to light the lamp 20. The alarm lamp 36 will remain lit while the standby lamp 20 is energized and lit. The lighted lamp 36 will alert servicing personnel that the primary lamp 19 has failed or is deactivated for some reason so that it can be replaced. It will be noted that the standby lamp 20 becomes automatically energized. The system is fail-safe because either the lamp 19 or the lamp 20 is always operating. When the failed lamp 19 is replaced, the transistor 50 is automatically biased to cut off and the standby lamp 28 is extinguished. Thus, the lamp 20 is 10 always available, either turned off and standing by or operating. Only the one lamp 19 or 20** is lighted at all times.

Figure 4:
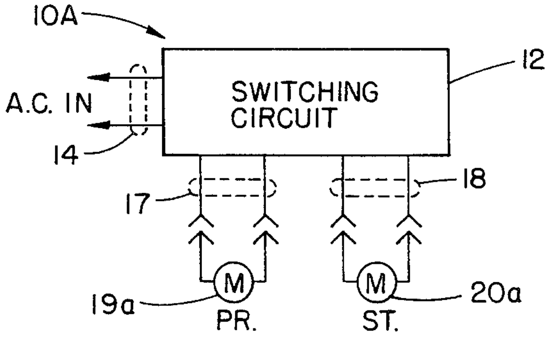
FIG. 4 is a diagram of the adapter of FIGS. 1 and 2, employing the switching circuit of FIG. 3, with the primary and standby lamps replaced respectively by motors.

It will be understood that the principles of the invention may be applied to other systems having power consuming devices such as motors, sound generators, electric heaters, etc. As shown in FIG. 4, the adapter 10A again employs the fail-safe switching circuit 12. Connected to the sockets 17 and 18 are a primary motor **19*a* and a standby motor 20*a*, in place of the primary lamp 19 and the standby lamp 20. While the motor 19*a* is operating, the standby motor 20*a* is automatically turned off and remains off. If the motor 19*a* fails or is disconnected for servicing, or becomes inactive for any reason, the standby motor 20*a* is automatically turned on. When the motor 19*a* is replaced or restored to operation, the motor 20*a* is automatically deenergized and restored to standby condition. The motors may of course be used to drive any appropriate appliances such as pumps, clocks, fans, etc. . . Other parts of the system shown in FIG. 4 corresponding to those of FIGS. 1-3** and are identically numbered. Wherever in the foregoing description of the invention reference is made to primary and standby lamps or motors, it should be understood that other power consuming devices such as sound generators, electrical heaters, etc. . . may be interchangeably used.

It should be understood that the foregoing relates to only a limited number of preferred embodiments of the invention which have been by way of example only and that it is intended to cover all changes and modifications of the examples of the invention herein chosen for the purpose of the disclosure which do not constitute departures from the spirit and scope of the invention.

What is claimed is:

1. An appliance adapter for maintaining in continuous, alternate operation primary and standby power consuming devices, comprising:

input terminals for applying alternating voltages from an external A.C. power source;

a full wave rectifier connected to said input terminals for rectifying said alternating voltage, said rectifier having a pair of output terminals;

first circuit means connected to said output terminals of said rectifier for applying rectified voltage to a primary power consuming device to keep the same in continuous operation;

second circuit means connected to said output terminals of said rectifier for applying rectified voltage to a standby power consuming device; and automatic switching means connected in circuit with said first and second circuit means, said automatic switching means comprising:

a transistor having a collector connected to said standby power consuming device, and an emitter connected to one of said rectifier output terminals and a base connected to said primary consuming device whereby said transistor is biased to cutoff when said primary consuming device is in operation and is biased to conduct when said primary consuming device fails, or is removed from said adapter;

a silcon controlled rectifier having an input connected to said standby power consuming device, and an output connected to said one of said rectifier inputs and a gate connected to said collector of said transistor; and signal means having one end connected to the other of said rectifier inputs, and another end connected to said standby consuming device, whereby failure of said primary consuming device or removal thereof from said appliance adapter will cause said transistor to conduct and thereby connect said standby consuming device to said rectifier output means and simultaneously turn on said silicon controlled rectifier whereby said signal means are energized to indicate said standby power consuming device is operating.

2. An appliance adapter as defined in claim 1, wherein said signal means is arranged to turn off when said standby power consuming device is rendered non-operating by resumption of operation by said primary power consuming device.

3. An appliance adapter as defined in claim 1, wherein said signal means is a light emitting diode.

4. An appliance adapter as defined in claim 1, wherein said primary and standby power consuming devices are illuminating lamps.

5. An appliance adapter as defined in claim 1, wherein said standby and power consuming devices are electric motors.

* * * * *